United States Patent
Dasher et al.

(10) Patent No.: US 10,069,885 B2
(45) Date of Patent: Sep. 4, 2018

(54) BANDWIDTH MANAGEMENT FOR OVER-THE-TOP ADAPTIVE STREAMING

(71) Applicant: Ericsson Television Inc., Duluth, GA (US)

(72) Inventors: Charles Hammett Dasher, Lawrenceville, GA (US); Robert Hammond Forsman, Sugar Hill, GA (US); Chris Phillips, Hartwell, GA (US); Jennifer Ann Reynolds, Duluth, GA (US)

(73) Assignee: ERICSSON AB, Stockholm (SE)

( * ) Notice: Subject to any disclaimer, the term of this patent is extended or adjusted under 35 U.S.C. 154(b) by 420 days.

(21) Appl. No.: 13/845,320

(22) Filed: Mar. 18, 2013

(65) Prior Publication Data

US 2014/0280764 A1    Sep. 18, 2014

(51) Int. Cl.
*H04L 29/06* (2006.01)
*H04L 29/08* (2006.01)

(52) U.S. Cl.
CPC .......... *H04L 65/60* (2013.01); *H04L 65/4084* (2013.01); *H04L 65/80* (2013.01); *H04L 67/2842* (2013.01)

(58) Field of Classification Search
CPC ..... H04L 65/60; H04L 65/80; H04L 65/4084; H04L 67/2842
See application file for complete search history.

(56) References Cited

U.S. PATENT DOCUMENTS

| 8,819,109 | B1* | 8/2014 | Krishnamurthy .......................... G06F 17/30905 |
|---|---|---|---|
| 2004/0148393 | A1* | 7/2004 | Breiter ..................... H04L 29/06 |
| 2006/0095943 | A1* | 5/2006 | Demircin ........... H04N 21/2365 |
| 2009/0006626 | A1* | 1/2009 | Yamagishi .......... H04L 12/5695 |
| 2009/0063682 | A1* | 3/2009 | Shur ....................... H04L 29/06 709/225 |
| 2009/0113045 | A1* | 4/2009 | Kozisek .................. H04L 43/50 |
| 2011/0149972 | A1 | 6/2011 | Hori et al. |
| 2011/0179186 | A1 | 7/2011 | Li et al. |

(Continued)

FOREIGN PATENT DOCUMENTS

| CN | 101247332 A | 8/2008 |
|---|---|---|
| KR | 10-2012-0055183 | 5/2012 |
| KR | 10-2013-0010744 | 1/2013 |

*Primary Examiner* — Chris Parry
*Assistant Examiner* — Soe M Hlaing

(57) ABSTRACT

A method, Over-The-Top (OTT) content provider server, Content Delivery Network (CDN) Redirector server, and CDN delivery server for managing bandwidth while delivering electronic content utilizing OTT adaptive streaming to a plurality of client devices at a customer premises. The OTT content provider server receives client device priorities from a customer and stores in a customer profile, a device weighting for each of the plurality of client devices. The OTT content provider server also stores an indication of an available bandwidth of a premises connection at the customer premises. When each client device requests OTT content, a delivery server in a CDN allocates a bitrate for the requesting client device based on the available bandwidth for the premises connection and the device weighting of the requesting client device, and delivers the requested OTT content to the requesting client device at the allocated bitrate.

10 Claims, 3 Drawing Sheets

(56) References Cited

U.S. PATENT DOCUMENTS

| | | | |
|---|---|---|---|
| 2011/0314130 A1* | 12/2011 | Strasman | H04L 29/06 |
| | | | 709/219 |
| 2012/0131623 A1 | 5/2012 | McDysan et al. | |
| 2012/0203903 A1* | 8/2012 | Nogami | H04N 7/17318 |
| 2012/0278833 A1* | 11/2012 | Tam | H04N 21/2343 |
| | | | 725/31 |
| 2013/0067109 A1 | 3/2013 | Dong et al. | |
| 2013/0179588 A1* | 7/2013 | McCarthy | H04N 21/23418 |
| | | | 709/231 |
| 2013/0272146 A1* | 10/2013 | Jones | H04L 43/50 |
| | | | 370/252 |

\* cited by examiner

BANDWIDTH MANAGEMENT FOR OVER-THE-TOP ADAPTIVE STREAMING

TECHNICAL FIELD

The present disclosure relates to a method, apparatus, and system for bandwidth management while delivering electronic content through over-the-top (OTT) adaptive streaming.

BACKGROUND

Traditionally, video services provided by telephone companies and cable operators have been distributed over managed access lines where the bandwidth required for a good quality of experience has been provisioned and is suitably robust. However, there are now many types of Internet-connected devices that are capable of high quality video playback. These include, for example, smart TVs, gaming consoles, PCs, laptops, tablets, smartphones, Blu-ray devices, and the like. These devices are typically connected to un-managed access networks such as 3G, home networks, and WiFi hot spots.

Additionally, video content providers are increasingly making their content available directly on the Internet via services such as Hulu™. Delivery of these services is typically handled by Content Delivery Networks (CDNs) that deliver the content over the top of operator networks, thus leading to the description "OTT video services". Although CDNs optimize delivery over the transit network, these services are all affected by varying degrees of congestion when they reach the local operator's network.

However, demand from consumers to watch video anytime, anywhere has lead to an urgent requirement for operators and CDNs to be able to deliver video services to these devices with high quality. For this purpose, a number of leading companies have developed HTTP Adaptive Streaming technologies, including Microsoft® Smooth Streaming, Apple® HLT, MPEG-DASH, and the like.

HTTP Adaptive Streaming is a bandwidth intensive application in which small sections of a video are delivered over a standard http connection. Adaptive streaming allows clients to select video content with a bitrate appropriate to their available bandwidth. Adaptive streaming gives clients the power to get the best video content the network is capable of delivering. However, due to factors such as client buffering and variances in device resolutions and source resolutions, HTTP Adaptive Streaming puts a strain on the network. As HTTP Adaptive Streaming Servers (HASS) become more involved with managing their own bandwidth usage, a need has arisen to enable OTT operators (such as Netflix® or Hulu®) and customers to tailor their bandwidth usage to optimize savings and quality of service.

SUMMARY

Another problem for OTT providers is contention between different devices within a given premises. The Applicants have determined that problems arise due to a lack of prioritization among the devices, and due to the manner in which the devices download and cache the content.

Caching media is a well-known technique for improving access times and optimizing bandwidth usage in telecommunication or enterprise networks. A cache uses a block of memory, or disk space, or other storage device to temporarily store a copy of some content that is likely to be needed in the future.

Progressive download is a way to download desired content from a server to a client device. Using progressive download, a client application running on the device can start playback of the desired content before the entire content is downloaded. When the download starts, the client application stores the beginning of the desired content, such as a media file, in a playout buffer. When the playout buffer contains a certain amount of the desired content, e.g. the first few seconds, the client application can start playback, while at the same time it continues to download the remaining of the desired content into the playout buffer.

If the device is, for example, a high definition (HD) TV capable of showing HD video and there is adequate bandwidth to download HD video, the TV will take as much bandwidth as is available to download the HD video as rapidly as possible. This works fine as long as there is no contention for the bandwidth. However, when another device such as a tablet computer in the premises initiates a download during the HDTV download, the bandwidth available to the HDTV is decreased and the HDTV may have to fall back to downloading standard definition video during the time period of reduced bandwidth. When the tablet completes its download and the full bandwidth becomes available again, the HDTV, which is programmed to provide the viewer with the best possible viewing experience, may dump its cache and download the content again at HD quality. With multiple devices in a premises such as a residential household vying for bandwidth, and all programmed to grab as much bandwidth as possible and to dump and replace lower quality content with higher quality content when able, bandwidth usage through a given premises pipe becomes confused, redundant, and highly inefficient.

Existing bandwidth policy managers assume the operators own the entire bandwidth "pipe", which is not the case for OTT providers such as Netflix. The confused and inefficient use of the available bandwidth noted above makes the outlook bleak for managing the bandwidth available to OTT providers. Such providers are forced to provide content to consumers with no guarantee of quality of service, other than what is provided by standard client-driven bandwidth selection, such as adaptive streaming. Such solutions force consumers to make the best of a bad situation (low bandwidth) and do not provide any flexibility in prioritizing devices, content, or similar features. OTT providers are often left unable to make deals with content providers regarding quality of service for their content (a common feature of content owner licensing agreements).

According to embodiments of the present disclosure, a method, OTT content provider server, CDN Redirector server, and CDN delivery server are provided wherein the OTT provider's network continues to provide support functionality in the usual manner (showing catalog, providing session and account information, and the like). When content is ready to be adaptively streamed, a delivery server on the edge of the CDN tests the available bandwidth of the target premises (i.e., the amount not currently being used for other purposes that an Internet Service Provider (ISP) has allocated to the premises). The system uses this available bandwidth to create a virtual model of the premises's bandwidth pipe, assuming the pipe is empty, and of the size of the unallocated bandwidth. This model is then used to manage the OTT sessions including setting client device priority weightings, content priority, and other useful features. The CDN delivery server then delivers content while allocating bandwidth according to the available bandwidth of the premises connection, the client device weightings, and any applicable policies.

One embodiment is directed towards a method of managing bandwidth while delivering electronic content utilizing OTT adaptive streaming to a plurality of client devices at a customer premises. The method includes the steps of storing in a customer profile database by an OTT content provider server, a device weighting for each of the plurality of client devices at the customer premises, the device weighting being based on a priority level for each of the plurality of client devices; and storing in the customer profile database by the OTT content provider server, an available bandwidth of a premises connection at the customer premises. When each client device requests OTT content from the OTT content provider server, a delivery server in a CDN allocates a bitrate for the requesting client device based on the available bandwidth for the premises connection and the device weighting of the requesting client device, and delivers the requested OTT content to the requesting client device at the allocated bitrate.

Another embodiment is directed towards an OTT content provider server for managing bandwidth while delivering electronic content utilizing OTT adaptive streaming to a plurality of client devices at a customer premises. The server includes a processor and a memory that stores computer program instructions, wherein when the processor executes the instructions, the server is caused to: store in a customer profile database, a device weighting for each of the plurality of client devices at the customer premises, the device weighting being based on a priority level for each of the plurality of client devices; and store in the customer profile database by the OTT content provider server, an available bandwidth of a premises connection at the customer premises. When each client device requests OTT content from the OTT content provider server, the OTT content provider server sends a response to the requesting client device providing a Uniform Resource Locator (URL) for a delivery server in a CDN and metadata indicating the available bandwidth of the premises connection at the customer premises and the device weighting for the requesting client device. Thereafter, the requesting client device sends the metadata to the URL in the CDN so than an assigned delivery server can deliver the requested OTT content to the requesting client device at an allocated bitrate based on the available bandwidth of the premises connection and the device weighting of the requesting client device.

Another embodiment is directed towards a CDN Redirector server, the Redirector server comprising a processor and a memory that stores computer program instructions, wherein when the processor executes the instructions, the server is caused to: receive from one of a plurality of client devices at a customer premises, a request for OTT content, the request including metadata providing a device weighting of the requesting client device and an indication of an available bandwidth for a premises connection, the device weighting being based on a priority level for the requesting client device. In response to the request, the Redirector server is configured to select a delivery server to fulfill the request for OTT content; and redirect the request for OTT content to the selected delivery server. Thereafter, the metadata enables the selected delivery server to deliver the requested OTT content to the requesting client device at an allocated bitrate based on the available bandwidth of the premises connection and the device weighting of the requesting client device.

Another embodiment is directed towards a delivery server in a CDN for delivering content to a plurality of client devices at a customer premises. The delivery server includes a processor and a memory that stores computer program instructions, wherein when the processor executes the instructions, the server is caused to receive directly or indirectly from one of the plurality of client devices at the customer premises, a request for OTT content, the request including metadata providing a device weighting of the requesting client device and an indication of an available bandwidth for a premises connection at the customer premises, the device weighting being based on a priority level for the requesting client device. The delivery server is also caused to allocate a bitrate for the requesting client device based on the available bandwidth for the premises connection and the device weighting of the requesting client device; and deliver the requested OTT content to the requesting client device at the allocated bitrate.

The delivery server may be configured to utilize knowledge of the available bandwidth of the customer premises and the device weightings for a high-priority first client device and a low-priority second client device to allocate bitrates to the first and second client devices enabling the first and second client devices to simultaneously stream OTT content without degrading the quality of service experienced by the first client device.

The system enables OTT providers to partially manage their streaming video content in a robust fashion. Providers can prioritize video content based, for example, on licensing agreements (for example, a particular content provider may want its content to have higher quality than any other content), or based on user preferences (for example, a user may want his connected TV to get a better picture than his smartphone).

Further features and benefits of embodiments of the disclosure will become apparent from the detailed description below.

BRIEF DESCRIPTION OF THE DRAWINGS

In the following section, the invention will be described with reference to exemplary embodiments illustrated in the figures, in which.

DETAILED DESCRIPTION

Figure 1:
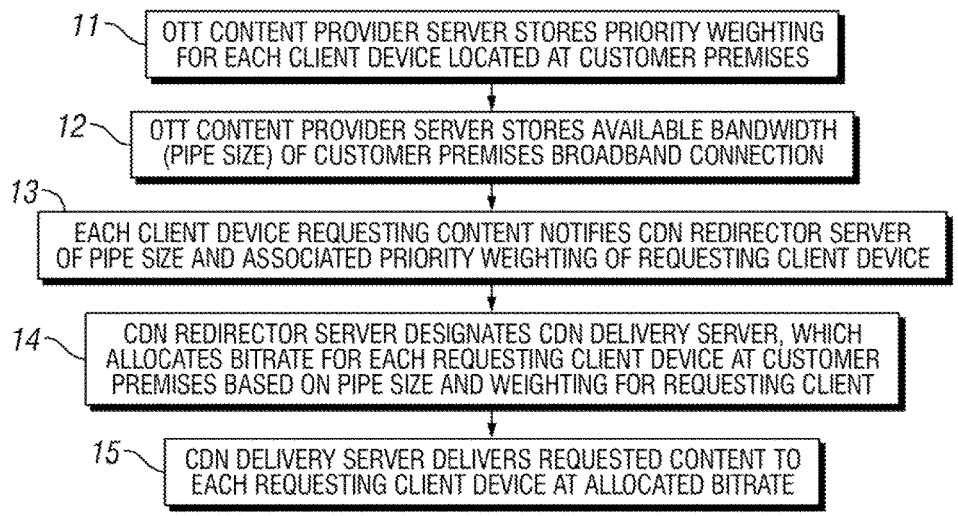
FIG. 1 is a flow chart illustrating the steps of an exemplary embodiment of a method of bandwidth management while delivering electronic content through over-the-top (OTT) adaptive streaming.

The present disclosure will now be described more fully hereinafter with reference to the accompanying drawings, in which preferred embodiments are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements. Additionally, it should be understood that the invention can be implemented in hardware or a combination of software stored on a non-transitory memory and executed by a general purpose computer or microprocessor. Various "servers" and "systems" disclosed herein are understood by those skilled in the art to include processors, non-transitory memories, and software comprising computer program instructions to be executed by the processors thereby causing the servers and systems to perform the stated functions.

FIG. 1 is a flow chart illustrating the steps of an exemplary embodiment of an overall method of bandwidth management while delivering electronic content through over-the-top (OTT) adaptive streaming. At step 11, an OTT content provider server, such as a server controlling an OTT Back Office System, stores a priority weighting for each client device located at a customer premises. At step 12, the OTT content provider server stores an indication of the available bandwidth (pipe size) of a broadband connection at the customer premises. At step 13, each client device requesting content notifies a CDN Redirector server of the premises pipe size and the associated priority weighting of the requesting client device. At step 14, the CDN Redirector server designates a CDN delivery server (for example an edge or regional server), which allocates a bitrate for each requesting client device at the customer premises based on the premises pipe size and the weighting for the requesting client. At step 15, the CDN delivery server delivers the requested content to each requesting client device at the allocated bitrate.

Figure 2:
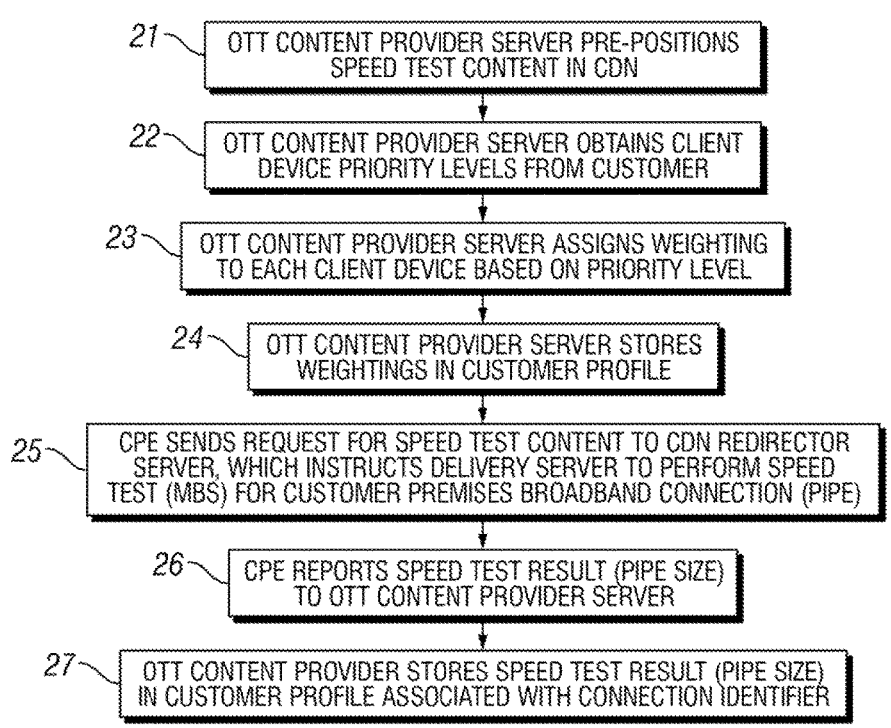
FIG. 2 is a flow chart illustrating the steps of an exemplary embodiment of a method of populating a customer profile at an OTT content provider.

FIG. 2 is a flow chart illustrating the steps of an exemplary embodiment of an overall method of populating a customer profile at an OTT content provider. At step 21, the OTT content provider server pre-positions speed test content in the CDN. At step 22, the OTT content provider server obtains client device priority levels from the customer. At step 23, the OTT content provider server assigns a weighting to each client device based on the priority level. At step 24, the OTT content provider server stores the weightings in the customer profile. At step 25, Customer Premises Equipment (CPE) such as one of the client devices or a Set Top Box (STB) sends a request to the CDN Redirector server for the speed test content. The CDN Redirector server instructs the delivery server to perform the speed test (Mbs) for the customer premises broadband connection (pipe). At step 26, the CPE reports the speed test result (pipe size) to the OTT content provider server. At step 27, the OTT content provider stores the speed test result (pipe size) in the customer profile associated with a connection identifier for the premises broadband connection.

Figure 3:
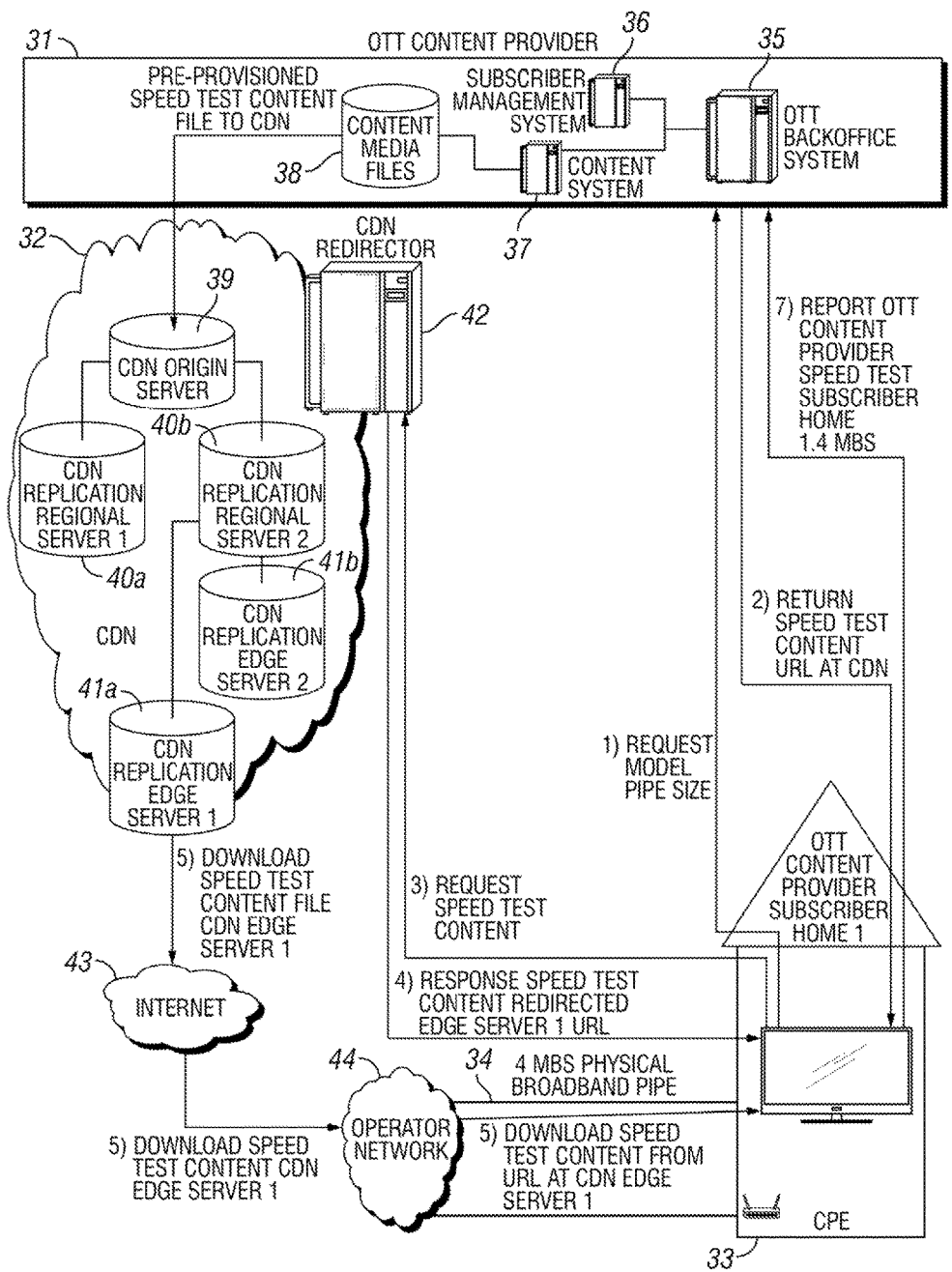
FIG. 3 is a message flow diagram illustrating the messages sent and functions performed in an exemplary method of determining a pipe size for a broadband connection at a customer premises.

FIG. 3 is a message flow diagram illustrating in more detail the messages sent and functions performed by various entities in the OTT content provider 31, the CDN 32, and the CPE 33 in an exemplary method of determining the pipe size for the broadband connection 34 at the customer premises. The OTT content provider is shown to include an OTT Back Office System 35, which may comprise a Subscriber Management System 36 including the customer profile (not shown), and a Content System 37 including storage for content media files 38. The OTT Back Office System is interchangeably referred to herein as "the OTT content provider server".

The CDN 32 is shown to include a CDN origin server 39, CDN replication regional servers 40*a* and 40*b*, and CDN replication edge servers 41*a* and 41*b*. Content that is more popular (i.e., requested more often) may be pushed to the edge servers 41*a* and 41*b* at a local level, while less popular content may be stored in the regional servers 40*a* and 40*b* at a regional level. A CDN Redirector server 42 receives requests for content from client devices, and redirects the requests to the appropriate delivery server, either a regional server or an edge server. If the CDN Redirector server determines that a client request is not to be redirected to an edge server due to a lack of content popularity, then the request may be redirected to a regional server closest to the customer premises. However, if the content popularity is, for example, above a threshold level (measured for example by the number of requests for the content over a given time period), the CDN Redirector server may determine instead that the client request should be redirected to a CDN edge server closest to the customer premises. Note, however, that if there is an existing "virtual pipe" 45 for a customer of the OTT content provider 31, the CDN Redirector server may redirect all content to that virtual pipe, regardless of whether that virtual pipe is built at a regional server or an edge server.

In accordance with various embodiments of the present disclosure, network resources may be allocated in the CDN for a "virtual pipe" 45 that is used to transport HTTP traffic associated with multimedia streams and, in particular, video streams. Network resources can be allocated to the virtual pipe for transporting a plurality of multimedia streams through the CDN. The virtual pipe can be managed to allow streaming devices to consume only as much bandwidth as is allocated to the virtual pipe, without interfering with traffic that is transported outside the virtual pipe. Within the virtual pipe, the bandwidth resources provided to individual streams can be managed, for example, to provide tiered management of streams (for example, based on device type, user account, or content type) so that streams of a same tier level have their access to network resources managed according to a same scheduling algorithm, such as a Fair Network Queuing (FNQ) or a Weighted Fair Network Queuing (WFNQ) algorithm. Additional details of the implementation of such an algorithm may be found in co-owned U.S. Pat. No. 8,549,570, entitled, "Methods and Apparatus for Managing Network Resources used by Multimedia Streams in a Virtual Pipe," issued Oct. 1, 2013.

In one embodiment, a pipe control node, such as a CDN delivery server, allocates network resources to a virtual pipe for transporting a plurality of multimedia streams through the network. The pipe control node then monitors utilization of the network resources by the plurality of multimedia streams transported through the virtual pipe relative to the network resources allocated to the virtual pipe, and manages the network resources that are used by the plurality of multimedia streams transported through the virtual pipe in response to the monitored utilization. In addition, the pipe control node may determine whether a particular network traffic transports a video stream by, for example, comparing a source address of the video stream to a known list of source addresses providing video streams. When the network traffic transports a video stream, the pipe control node may include the particular network traffic in the virtual pipe in response. Otherwise, the pipe control node may exclude the particular network traffic from utilizing the network resources allocated to the virtual pipe.

Still referring to FIG. 3, the CPE 33 may include, for example, client devices, STBs, wireless routers, Optical Network Terminations (ONTs), home base stations, and the like, which enable the customer to communicate with the OTT content provider server 35 and the CDN 32, and to receive content through the Internet 43 and/or an operator network 44.

In the description herein, message numbering is presented in the format: figure number-message number (for example message 3-1, message 3-2, message 4-1, message 4-2, and so on).

As an initial condition, the OTT content provider server 35 has pre-positioned the speed test content in the CDN 32. In message 3-1, a client device at the customer premises sends a request to the OTT content provider server 35 requesting to model the pipe size at the customer premises. In message 3-2, the OTT content provider server returns to the requesting client device, a Uniform Resource Locator (URL) for requesting speed test content at the CDN. In message 3-3, the client device uses the URL to send a request for the speed test content to the CDN Redirector server 42. In message 3-4, the CDN Redirector server responds that the request has been redirected to the delivery server where the speed test content is stored, in this case, edge server 41*a*. In message (or action) 3-5, the edge server performs the speed test by downloading the speed test content through the Internet 43 and the operator network 44 to the requesting client device. As shown in the example of FIG. 3, the measured bandwidth of the premises broadband pipe 34 is 4 Mbs. In message 3-6, the requesting client device reports the result of the speed test to the OTT content provider server 35, which stores the information in the customer profile in the subscriber management system 36 together with an identifier of the customer premises pipe.

Figure 4:
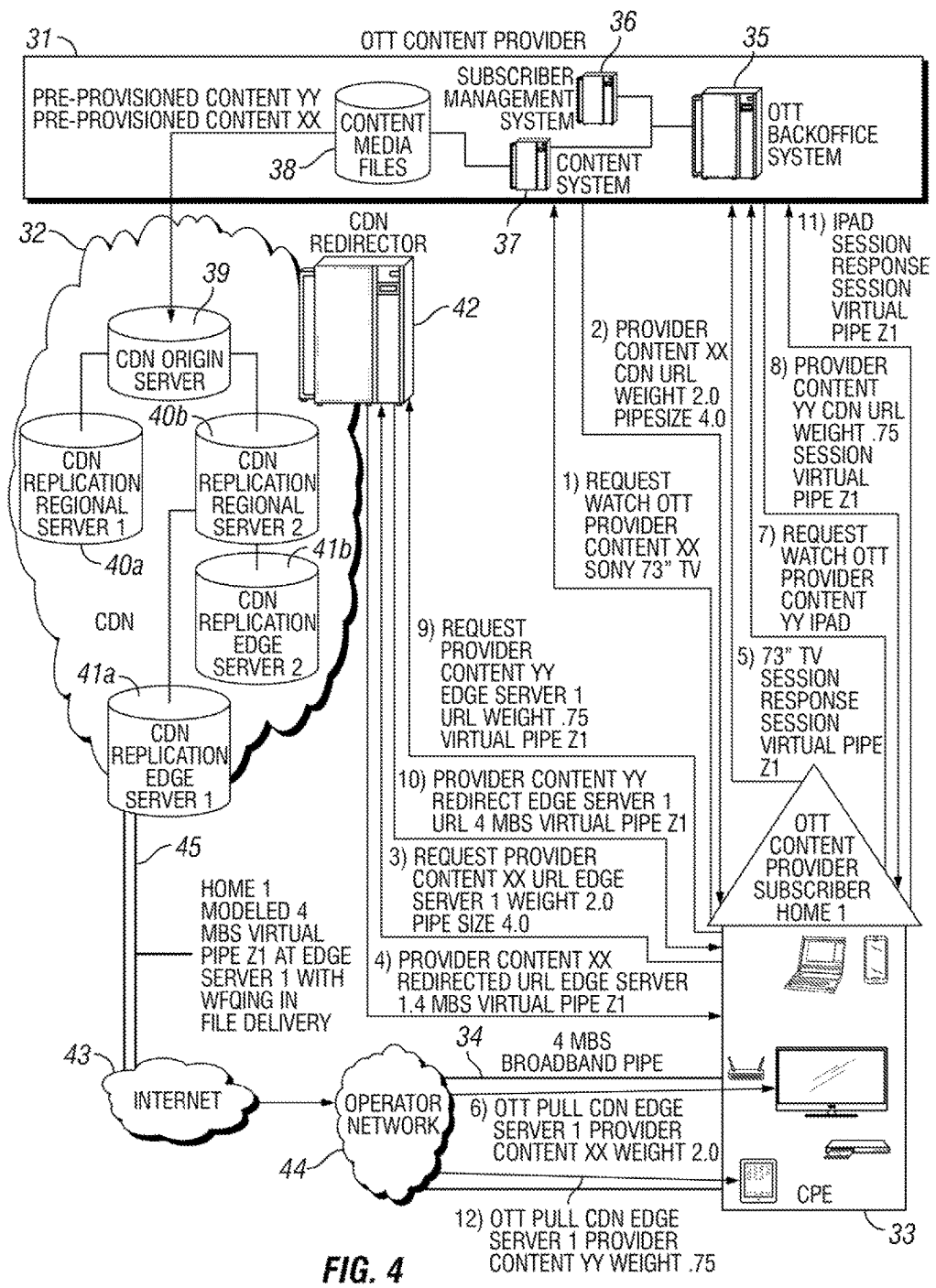
FIG. 4 is a message flow diagram illustrating the messages sent and functions performed in an exemplary method of bandwidth management while delivering electronic content through OTT adaptive streaming to multiple client devices at a customer premises.

FIG. 4 is a message flow diagram illustrating in more detail the messages sent and functions performed in an exemplary method of bandwidth management while delivering electronic content through OTT adaptive streaming to multiple client devices at the customer premises. As initial conditions, the OTT content provider server 35 has pre-positioned content XX and content YY in the CDN 32; and the OTT content provider server has stored in the customer profile, the available bandwidth (pipe size) of the premises broadband connection and the weightings of various client devices at the customer premises. In the example shown, the pipe size of the premises connection is 4 Mbs, and the OTT content provider server has stored a weighting of 2.0 for the customer's 73-inch HDTV and a weighting of 0.75 for an iPad tablet computer belonging to the customer's daughter.

In message 4-1, the customer sends a request to the OTT content provider server 35 requesting to watch content XX on his 73-inch HDTV. In message 4-2, the OTT content provider server returns a URL for requesting content XX at the CDN 32 together with metadata including the weighting for the HDTV (2.0) and the pipe size (4.0). In message 4-3, a client application in the HDTV uses the URL to send a request for content XX to the CDN Redirector server 42, which redirects the request in this example to edge server 41*a*. The request includes the HDTV weighting (2.0) and the pipe size (4.0). In message 4-4, the CDN Redirector server responds that the request has been redirected to edge server 41*a*, which has an existing virtual pipe Z1 for the requesting customer premises. In message 4-5, the client application in the HDTV notifies the OTT content provider server that a session response has been received indicating use of the virtual pipe Z1. In message (action) 4-6, the HDTV begins streaming content XX. The content XX is sent through the CDN virtual pipe Z1, as specified in the URL metadata (i.e., weighting 2.0 and pipe size 4.0).

Thereafter, the customer's daughter turns on her iPad and requests in message 4-7 to watch content YY on the iPad. The OTT content provider server 35 identifies that this customer account is already streaming to the HDTV, and modifies the virtual pipe and weighting data accordingly. In message 4-8, the OTT content provider server returns a URL for requesting content YY at the CDN 32 together with metadata including the weighting for the iPad (0.75) and the virtual pipe identifier Z1. In message 4-9, a client application on the iPad uses the URL to send a request for content YY to the CDN Redirector server 42, which redirects the request in this example to edge server 41*a*. The request includes the iPad weighting (0.75) and the virtual pipe identifier Z1. In message 4-10, the CDN Redirector server responds that the request has been redirected to edge server 41*a*, which has the existing virtual pipe Z1 for the requesting customer premises. In message 4-11, the client application in the iPad notifies the OTT content provider server that a session response has been received indicating use of the virtual pipe Z1. In message (action) 4-12, the iPad begins streaming content YY. The content YY is sent through the CDN virtual pipe Z1 as specified in the URL metadata (i.e., weighting 0.75 and pipe size 4.0), while sharing room with content XX.

In an alternative embodiment, the OTT content provider server 35 may have knowledge of the appropriate delivery server in the CDN network 32. Thus, the CDN Redirector server 42 is not needed. Therefore, in messages 4-2 and 4-8, the OTT content provider server 35 provides the requesting client devices with the URL for the delivery server, in this example edge server 41*a*, rather than the URL of the CDN Redirector server. Consequently, the requests for content XX and content YY in messages 4-3 and 4-9, respectively, are sent directly from the requesting client devices to the edge server 41*a*.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:
1. A method of managing bandwidth within a premises bandwidth pipe while delivering electronic content utilizing Over-The-Top (OTT) adaptive streaming to a plurality of progressive-download adaptive-streaming client devices at a customer premises, the method comprising the steps of:
storing in a customer profile database by an OTT content provider server, a device weighting for each of the plurality of progressive-download adaptive-streaming client devices at the customer premises, the device weighting being based on a priority level for each of the plurality of progressive-download adaptive-streaming client devices;
when a progressive-download adaptive-streaming client device requests OTT content from the OTT content provider server and content is ready to be adaptively streamed to the customer premises, performing the following by a delivery server in a Content Delivery Network (CDN):
monitoring available bandwidth of the premises bandwidth pipe at the customer premises;
utilizing the monitored available bandwidth to create a virtual model of the premises bandwidth pipe, said model identifying the monitored available bandwidth and identifying which portion of the available bandwidth is allocated to each of the plurality of progressive-download adaptive-streaming client devices based on the device weightings for the plurality of progressive-download adaptive-streaming client devices;

allocating a bitrate for the requesting progressive-download adaptive-streaming client device according to the virtual model of the premises bandwidth pipe and the device weighting for the requesting progressive-download adaptive-streaming client device; and when the progressive-download adaptive-streaming client device requests a specific content segment, utilizing a Weighted Fair Network Queuing (WFNQ) algorithm to deliver the requested OTT content segment to the requesting progressive-download adaptive-streaming client device, wherein the WFNQ algorithm causes the delivery server to continuously throttle delivery of the requested OTT content segment at the allocated bitrate.

2. The method according to claim 1, wherein the step of allocating a bitrate for the requesting progressive-download adaptive-streaming client device includes utilizing knowledge of the available bandwidth for the premises connection and the device weightings for a high-priority first progressive-download adaptive-streaming client device and a low-priority second progressive-download adaptive-streaming client device to allocate bitrates to the first and second progressive-download adaptive-streaming client devices enabling the first and second progressive-download adaptive-streaming client devices to simultaneously stream OTT content without degrading a quality of service experienced by the first progressive-download adaptive-streaming client device.

3. A system for managing bandwidth within a premises bandwidth pipe while delivering electronic content through a Content Delivery Network (CDN) utilizing OTT adaptive streaming to a plurality of progressive-download adaptive-streaming client devices at a customer premises, the system comprising:

a delivery server in the CDN; and an over-The-Top (OTT) content provider server comprising a processor and a memory that stores computer program instructions, wherein when the processor executes the instructions, the OTT content provider server is caused to:

store in a customer profile database, a device weighting for each of the plurality of progressive-download adaptive-streaming client devices at the customer premises, the device weighting being based on a priority level for each of the plurality of progressive-download adaptive-streaming client devices;

obtain an available bandwidth of a premises connection at the customer premises, wherein the OTT content provider server is adapted to:

pre-provision speed test content in the CDN;

receive from the customer premises, a request to determine the available bandwidth of the premises connection at the customer premises;

send a response to the customer premises providing a URL for accessing the speed test content in the CDN; and receive from the customer premises, a measurement of the available bandwidth of the premises connection at the customer premises;

create a virtual model of the premises bandwidth pipe, said model identifying the tested available bandwidth of the premises connection and identifying which portion of the available bandwidth is allocated to each of the plurality of progressive-download adaptive-streaming client devices based on the device weightings for the plurality of progressive-download adaptive-streaming client devices; and when each progressive-download adaptive-streaming client device requests OTT content from the OTT content provider server, send a response to the requesting progressive-download adaptive-streaming client device providing a Uniform Resource Locator (URL) for the delivery server in the CDN and metadata indicating the virtual model of the premises bandwidth pipe;

wherein the requesting progressive-download adaptive-streaming client device sends the metadata indicating the virtual model of the premises bandwidth pipe to the URL in the CDN so that the delivery server can utilize a Weighted Fair Network Queuing (WFNQ) algorithm to deliver the requested OTT content to the requesting progressive-download adaptive-streaming client device, wherein the WFNQ algorithm causes the delivery server to continuously throttle delivery of the requested OTT content segment at an allocated bitrate according to the virtual model of the premises bandwidth pipe and the device weighting for the requesting progressive-download adaptive-streaming client device when the progressive-download adaptive-streaming client device requests a specific content segment.

4. The OTT content provider server according to claim 3, wherein the OTT content provider server is configured to:

receive from the customer premises, the priority level for each of the plurality of progressive-download adaptive-streaming client devices; and determine from the priority level for each progressive-download adaptive-streaming client device, an associated device weighting.

5. The OTT content provider server according to claim 4, wherein the OTT content provider server is configured to determine from the priority levels for multiple progressive-download adaptive-streaming client devices, associated device weightings that ensure that a quality of service experienced by a high-priority first progressive-download adaptive-streaming client device is not degraded when a low-priority second progressive-download adaptive-streaming client device simultaneously streams OTT content.

6. A system for managing bandwidth within a premises bandwidth pipe while delivering electronic content through a Content Delivery Network (CDN) utilizing Over-The-Top (OTT) adaptive streaming to a plurality of progressive-download adaptive-streaming client devices at a customer premises, the system comprising:

a selected delivery server in the CDN; and a CDN Redirector server, the CDN Redirector server comprising a processor and a memory that stores computer program instructions, wherein when the processor executes the instructions, the CDN Redirector server is caused to:

receive from one of a plurality of progressive-download adaptive-streaming client devices at a customer premises, a request for speed test content;

instruct a delivery server where the speed test content is stored to perform a speed test for a customer premises connection;

send a response to the requesting progressive-download adaptive-streaming client device indicating that the request has been redirected to the delivery server where the speed test content is stored;

receive from the requesting progressive-download adaptive-streaming client device, a request for OTT content, the request including metadata providing a virtual model of a premises bandwidth pipe, said model identifying a tested available bandwidth of the premises connection and identifying which portion of the available bandwidth is allocated to each of the plurality of progressive-download adaptive-streaming client devices based on the device weightings for the plurality of progressive-download adaptive-streaming client devices, the device weightings being based on priority levels for each of the plurality of progressive-download adaptive-streaming client devices;

select the selected delivery server to fulfill the request for OTT content; and redirect the request for OTT content to the selected delivery server;

wherein the metadata providing the virtual model of the premises bandwidth pipe enables the selected delivery server to utilize a Weighted Fair Network Queuing (WFNQ) algorithm to deliver the requested OTT content to the requesting progressive-download adaptive-streaming client device, wherein the WFNQ algorithm causes the delivery server to continuously throttle delivery of the requested OTT content segment at an allocated bitrate based on the virtual model of the premises bandwidth pipe and the device weighting for the requesting progressive-download adaptive-streaming client device when the requesting progressive-download adaptive-streaming client device requests a specific content segment.

7. The CDN Redirector server according to claim 6, wherein the CDN Redirector server is configured to select a delivery server by:
determining whether the requested OTT content is stored at a regional level or at a local level in the CDN network based on how often the OTT content is requested;
upon determining the requested OTT content is stored at the regional level, selecting a regional server closest to the customer premises; and
upon determining the requested OTT content is stored at the local level, selecting an edge server closest to the customer premises.

8. The CDN Redirector server according to claim 6, wherein the CDN Redirector server is further configured to select a delivery server by:
determining whether there is a delivery server in the CDN that has established a virtual pipe for the customer premises;
upon determining there is a delivery server in the CDN that has established a virtual pipe for the customer premises, selecting the delivery server with the virtual pipe for the customer premises; and
upon determining there is not a delivery server in the CDN that has established a virtual pipe for the customer premises, selecting either a regional server or an edge server closest to the customer premises, depending upon a level in the CDN where the requested OTT content is stored.

9. A delivery server in a Content Delivery Network (CDN) for delivering content to a plurality of progressive-download adaptive-streaming client devices at a customer premises, the delivery server comprising a processor and a memory that stores computer program instructions, wherein when the processor executes the instructions, the server is caused to:
receive directly or indirectly from one of the plurality of progressive-download adaptive-streaming client devices at the customer premises, a request for Over-The-Top (OTT) content, the request including metadata providing a device weighting of the requesting progressive-download adaptive-streaming client device and an indication of an available bandwidth for a premises connection at the customer premises, the device weighting being based on a priority level for the requesting progressive-download adaptive-streaming client device;
when content is ready to be adaptively streamed to the customer premises, performing the following:
monitor available bandwidth of the premises bandwidth pipe at the customer premises;
utilize the monitored available bandwidth to create a virtual model of the premises bandwidth pipe, said model identifying the monitored available bandwidth and identifying which portion of the available bandwidth is allocated to each of the plurality of progressive-download adaptive-streaming client devices based on the device weightings for the plurality of progressive-download adaptive-streaming client devices;
allocate a bitrate for the requesting progressive-download adaptive-streaming client device based on a virtual model of a premises bandwidth pipe and the device weighting for the requesting progressive-download adaptive-streaming client device, said model identifying the available bandwidth of the premises connection and identifying which portion of the available bandwidth is allocated to each of the plurality of progressive-download adaptive-streaming client devices based on the device weightings for the plurality of progressive-download adaptive-streaming client devices; and
when the progressive-download adaptive-streaming client device requests a specific content segment, utilize a Weighted Fair Network Queuing (WFNQ) algorithm to deliver the requested OTT content segment to the requesting progressive-download adaptive-streaming client device, wherein the WFNQ algorithm causes the delivery server to continuously throttle delivery of the requested OTT content segment at the allocated bitrate.

10. The delivery server according to claim 9, wherein the delivery server is configured to utilize knowledge of the available bandwidth and the device weightings for a high-priority first progressive-download adaptive-streaming client device and a low-priority second progressive-download adaptive-streaming client device to allocate bitrates to the first and second progressive-download adaptive-streaming client devices enabling the first and second progressive-download adaptive-streaming client devices to simultaneously stream OTT content without degrading the quality of service experienced by the first progressive-download adaptive-streaming client device.

* * * * *